(12) United States Patent
Zhang et al.

(10) Patent No.: US 11,012,206 B2
(45) Date of Patent: May 18, 2021

(54) TRIGGERING A BEAM REFINEMENT REFERENCE SIGNAL

(71) Applicant: INTEL IP CORPORATION, Santa Clara, CA (US)

(72) Inventors: Yushu Zhang, Beijing (CN); Gang Xiong, Portland, OR (US); Bishwarup Mondal, San Ramon, CA (US); Yuan Zhu, Beijing (CN); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 260 days.

(21) Appl. No.: 16/074,393

(22) PCT Filed: Nov. 17, 2016

(86) PCT No.: PCT/US2016/062585
§ 371 (c)(1),
(2) Date: Jul. 31, 2018

(87) PCT Pub. No.: WO2017/180187
PCT Pub. Date: Oct. 19, 2017

(65) Prior Publication Data
US 2020/0274666 A1     Aug. 27, 2020

Related U.S. Application Data

(63) Continuation of application No. PCT/CN2016/079394, filed on Apr. 15, 2016.

(51) Int. Cl.
*H04L 5/00* (2006.01)
*H04B 7/06* (2006.01)
*H04B 7/08* (2006.01)

(52) U.S. Cl.
CPC ......... *H04L 5/0048* (2013.01); *H04B 7/0617* (2013.01); *H04B 7/086* (2013.01)

(58) Field of Classification Search
CPC .. H04B 7/0408; H04B 7/0421; H04B 7/0695; H04B 7/088; H04L 27/2613; H04L 27/2692; H04W 72/046; H04W 72/085
See application file for complete search history.

(56) References Cited

U.S. PATENT DOCUMENTS

2009/0067539 A1   3/2009   Maltsev et al.
2010/0068993 A1   3/2010   Khan
(Continued)

FOREIGN PATENT DOCUMENTS

TW      2017247768       7/2017
WO      2017074497 A1    5/2017

OTHER PUBLICATIONS

PCT International Preliminary Report on Patentability in PCT International Application Serial No. PCT/US2016/025622 dated May 1, 2018 (9 pages).

(Continued)

*Primary Examiner* — Mansour Oveissi
(74) *Attorney, Agent, or Firm* — Alliance IP, LLC

(57) ABSTRACT

The present disclosure provides for the trigger of a beam refinement reference signal (BRRS) message. Triggering a BRRS message can include determining that a measured quality of a transmit and receive (Tx-Rx) beam pair is below the first value of the first quality threshold, the Tx-Rx beam pair corresponding to a current transmit (Tx) beam from an evolved node B (eNodeB) and the current receive (Rx) beam at the user equipment (UE), encoding a message for the eNodeB based on the determination that the quality of the Tx-Rx beam pair is below the quality threshold, wherein the message comprises a request for one or more BRRS, and (Continued)

processing the one or more BRRS to select a different Rx beam at the UE than the current Rx beam.

25 Claims, 10 Drawing Sheets

(56) References Cited

U.S. PATENT DOCUMENTS

| | | |
|---|---|---|
| 2011/0110453 A1 | 5/2011 | Prasad et al. |
| 2011/0149842 A1 | 6/2011 | Cordeiro |
| 2013/0040682 A1 | 2/2013 | Chang et al. |
| 2013/0051364 A1 | 2/2013 | Seol et al. |
| 2013/0201848 A1 | 8/2013 | Kazmi et al. |
| 2014/0056243 A1 | 2/2014 | Pelletier et al. |
| 2014/0211731 A1 | 7/2014 | Inoue et al. |
| 2014/0348109 A1 | 11/2014 | Chen et al. |
| 2015/0200755 A1 | 7/2015 | Hammarwall et al. |
| 2015/0289281 A1 | 10/2015 | Kim et al. |
| 2016/0036510 A1 | 2/2016 | Hosoya et al. |
| 2016/0338138 A1 | 11/2016 | Pelletier et al. |
| 2017/0302414 A1* | 10/2017 | Islam ............... H04B 7/0421 |
| 2018/0115357 A1 | 4/2018 | Park et al. |
| 2018/0176810 A1 | 6/2018 | Thangarasa et al. |
| 2019/0007116 A1 | 1/2019 | Chang et al. |

OTHER PUBLICATIONS

PCT International Preliminary Report on Patentability in PCT International Application Serial No. PCT/US2016/062585 dated Oct. 25, 2018 (11 pages).
PCT International Search Report and Written Opinion in PCT Application Serial No. PCT/US2016/025622 dated Jul. 26, 2016 (11 pages).
USPTO Non-Final Office Action in U.S. Appl. No. 15/752,764 dated Feb. 26, 2019 (6 pages).
USPTO Non-Final Office Action in U.S. Appl. No. 15/752,764 dated Sep. 9, 2019 (11 pages).
PCT/US2016/062585, International Search Report and Written Opinion, dated Feb. 3, 2017, 15 pages.
Taiwan Patent Office; Search Report and Office Action issued in TW Patent Application No. 10610680, dated Jul. 2, 2020; 11 pages including partial English translation.

* cited by examiner

Currently Selected NW Beam   Newly Selected NW Beam
 Currently Selected UE Beam   Newly Selected UE Beam Type 1b

| | | | |
|---|---|---|---|
|  Currently Selected NW Beam | |  Newly Selected NW Beam | |
|  Currently Selected UE Beam | |  Newly Selected UE Beam | |

TRIGGERING A BEAM REFINEMENT REFERENCE SIGNAL

RELATED APPLICATIONS

This application is a national stage filing under 35 U.S.C. § 371 of International Patent Application No. PCT/US2016/062585, filed Nov. 17, 2016, which claims the benefit of International Patent Application No. PCT/CN2016/079394, filed Apr. 15, 2016, each of which is incorporated by reference herein in its entirety.

TECHNICAL FIELD

The present disclosure relates to triggering a beam refinement reference signal (BRRS). In particular, the present disclosure relates to triggering a BRRS via user equipment.

DETAILED DESCRIPTION OF PREFERRED EMBODIMENTS

Figure 1:
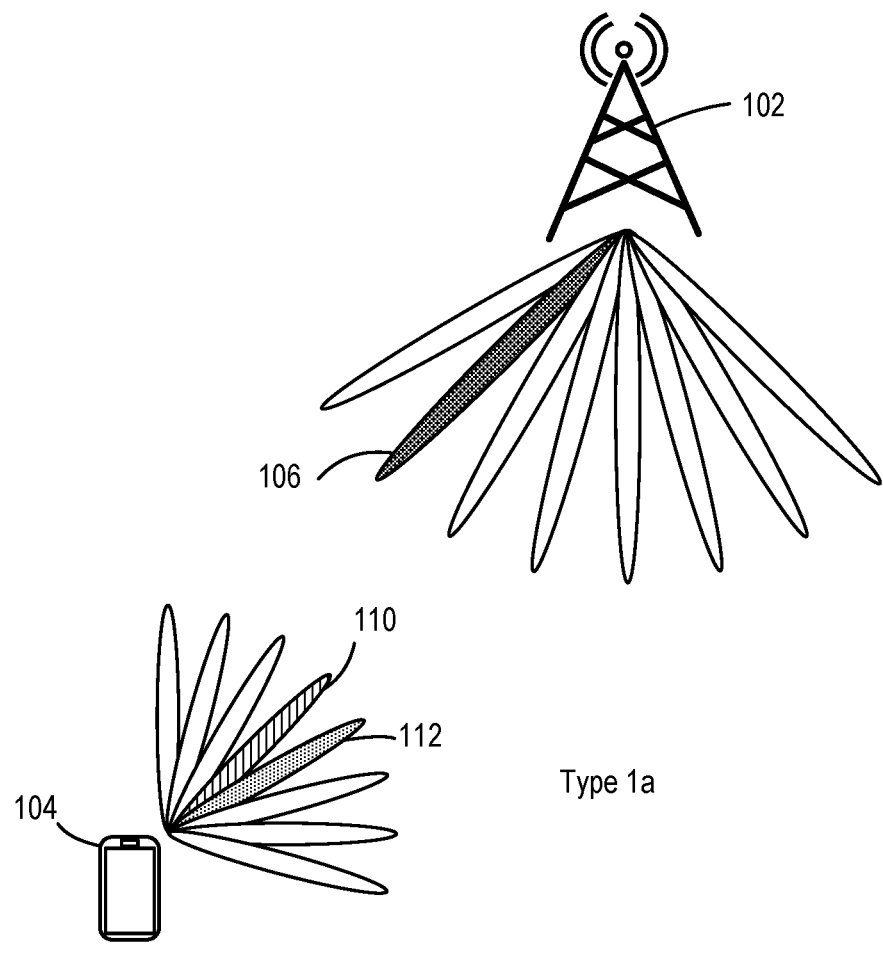
FIG. 1 is a system diagram for triggering a beam refinement reference signal (BRRS) according to one embodiment.
Figure 1:
Figure 1:
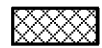
Figure 1:
Figure 1:

Wireless mobile communication technology uses various standards and protocols to generate and/or transmit data between a base station and a wireless communication device. Wireless communication system standards and protocols can include, for example, a 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi®. In 3GPP radio access networks (RANs) in LTE systems, a base station may include Evolved Universal Terrestrial Radio Access Network (E-UTRAN) Node B (also commonly denoted as evolved Node B, enhanced Node B, eNodeB, or eNB) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

In a multiple input multiple output (MIMO) system comprising long term evolution advanced (LTE-A) and/or fifth generation (5G) networks, the eNodeBs can maintain a plurality of transmitting (Tx) beams, which can be called as the network (NW) beams. A beam can describe a transmission direction or a transmission direction and a transmission of data. As used herein the NW can include an LTE-A network, a 5G network, and/or a subsequent (e.g., next generation) E-UTRAN network. The UE can also maintain a plurality of receiving (Rx) beams, which can be referred to as UE beams. For a link between a UE and an eNodeB, a best NW-UE beam pair can be selected to achieve a highest receiving power as compared to other NW-UE beam pairs.

However, as a result of some factors such as UE rotation, movement, blockage and so on, the best NW-UE beam pair may change. A best NW-UE beam pair can describe a NW-UE beam pair that has a higher receiving power than the receiving power of the other NW-UE beam pairs for a specific UE and eNodeB. As a UE rotates, moves, and/or is blocked then a receiving power of a currently selected NW-UE beam pair can change such that the receiving power of a different NW-UE beam pair may be greater than the receiving power of the currently selected NW-UE beam pair. In some examples, such as when the UE rotates, the UE beam and/or the NW beam may need to be updated.

A beam refinement reference signal (BRRS) can be utilized by an eNodeB to transmit multiple replicas in an orthogonal frequency division multiplex (OFDM) symbol with a same NW beam so that the UE can measure different UE beams and select a best UE beam having the highest receiving power with the NW beam as compared with other NW-UE beam pairs. When the UE finds that the current UE beam may not be the best beam, it may be necessary to trigger a BRRS transmission. That is, the UE may trigger a BRRS transmission instead of waiting for a scheduled BRRS transmission. As used herein, a trigger can be interpreted as a request for the BRRS, an indication that the receiving power for a current Tx-Rx beam pair or the receiving quality for a current Tx-Rx beam pair is below a certain threshold, and/or an indication that a certain Tx-Rx beam pair quality is above a certain threshold.

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system diagram for triggering a BRRS according to one embodiment. FIG. 1 includes an eNodeB 102 and a UE 104. The eNodeB 102 can broadcast data via a plurality of NW beams including a NW beam 106. The UE 104 can also broadcast data via a plurality of UE beams including UE beams 110 and 112.

The beam 106 is a currently selected NW beam for the eNodeB 102. The beam 110 is a currently selected UE beam for the UE 104 before the broadcast of the BRRS. The beam 112 is a newly selected UE beam for the UE 104 after the broadcast of the BRRS.

The UE may identify a newly selected NW-UE beam pair that has a higher receiving power than a currently selected NW-UE beam pair due to rotation, movement and/or blockage. A new channel cluster may indicate that a plurality of channel subpaths can have different angle of departure (AoD), zenith angle of departure (ZoD), angle of arrival (AoA) and zenith angle of arrival (ZoA). For example, when the target AoD and/or ZoD changes, a new NW beam may be applied. When the target AoA and/or ZoA changes, a new UE beam may be applied. As such, the UE 104 can determine that a new NW-UE beam pair can be selected based on the AoD, ZoD, AoA, and/or ZoA.

A new channel cluster identifies a new strongest channel cluster, which the NW-UE beam can target. A fading channel can include multiple channel clusters. A channel cluster can contain multiple paths, which are in a similar direction. The beam can target a strongest channel cluster. However, due to the UE's movement, the strongest channel cluster may change.

Due to the rotation, movement, and/or blockage of the UE and/or the eNodeB and based on measurements performed using a beam reference signal (BRS) the UE 104 can obtain a higher receiving power from a new NW beam with a current UE beam, a new UE beam with a current NW beam, or a new NW beam with a new UE beam.

As used herein, BRS is a periodic signal, where different NW beams can be applied. The UE can select a NW beam based on the measurement of BRS. BRRS is an aperiodic signal, where one NW beam can be applied. The UE can use different UE beams to receive the BRRS and select one best UE beam. Generally, BRS is used for NW beam selection while BRRS is used for UE beam selection.

For a new UE beam with a current NW beam and/or a new NW beam with a new UE beam, a UE beam update can be triggered. A BRRS transmission may be triggered for the UE 104 to refine the UE beam (e.g., select a different UE beam to pair with the current NW beam). For a new NW beam with a current UE beam, multiple BRRS resources can be requested. Multiple BRRS resources can include a resource for each NW beam. A channel state information reference signal (CSI-RS) resource can also be requested by a UE to refine the UE beam.

There can be four types of UE triggered BRRS messages. In some examples, more than four or fewer than four types of UE triggered BRRS messages can be implemented. For example, a type 1a BRRS transmission (e.g., message), a type 1b BRRS transmission, a type 2a BRRS transmission, and a type 2b BRRS transmission can be requested. A type 1a BRRS transmission can be provided for a UE beam refinement for a low (e.g., gradual) UE beam change with a currently selected NW beam. A type 1b BRRS transmission can be provided for a UE beam refinement for a high (e.g., full) UE beam change with a currently selected NW beam. A type 2a BRRS transmission can be provided for a UE beam refinement for a low UE beam change with the newly selected NW beam. A type 2b BRRS transmission can be provided for a UE beam refinement for a high UE beam change with the newly selected NW beam.

Figure 2:
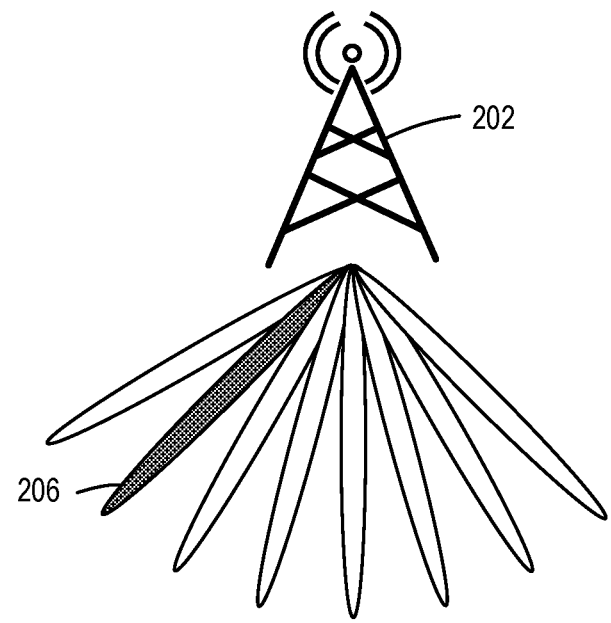
FIG. 2 is a system diagram for triggering a BRRS according to one embodiment.
Figure 2:
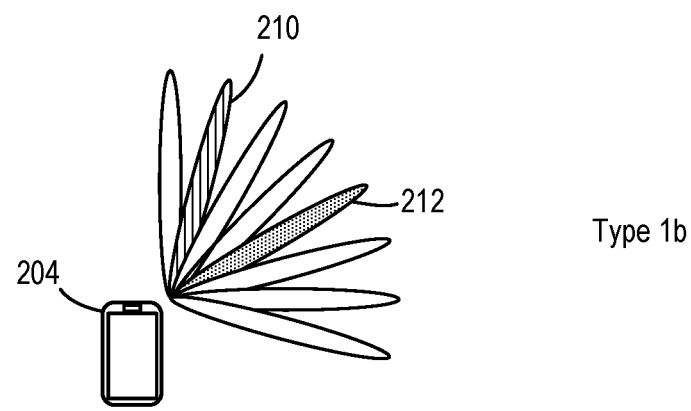
Figure 2:
Figure 2:
Figure 2:
Figure 2:
Figure 3:
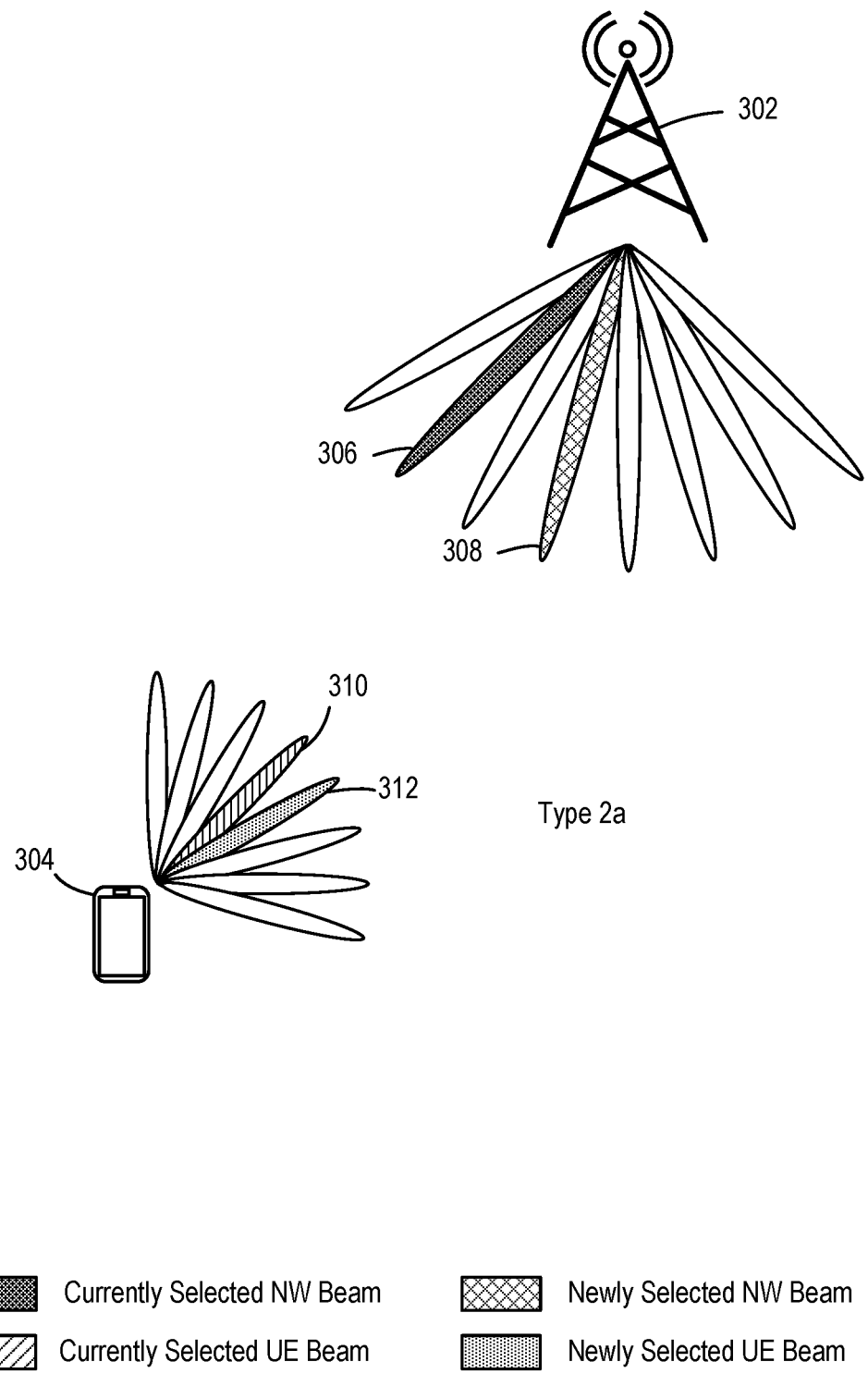
FIG. 3 is a system diagram for triggering a BRRS according to one embodiment.
Figure 4:
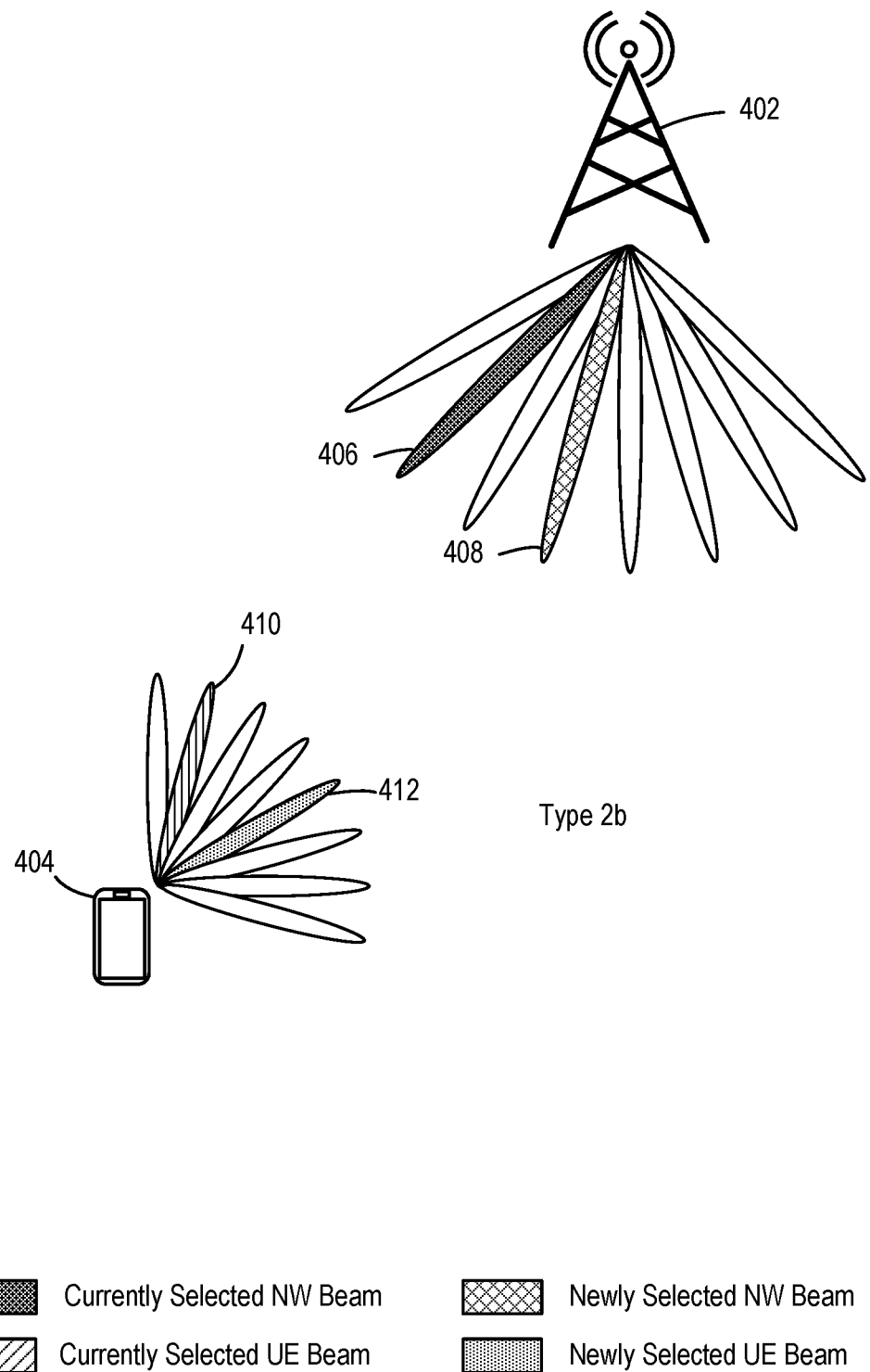
FIG. 4 is a system diagram for triggering a BRRS according to one embodiment.

As used herein, the terms "low UE beam change," "gradual UE beam change," "high UE beam change," and/or "full UE beam change" are used to describe a type of change of a UE beam. For example, FIGS. 1 and 3 show a low/gradual UE beam change between the current UE beams 110 and 310 and the new UE beams 112 and 312. FIGS. 2 and 4 show a high/full UE beam change between the current UE beams 210 and 410 and the new UE beams 212 and 412. The type of change of the UE beam can be associated with a degree of rotation, movement, and/or blockage of the UE. For example, given that a UE is rotated, then the type of BRRS transmission (e.g., type 1a BRRS transmission, type 1b BRRS transmission, type 2a BRRS transmission, or type 2b BRRS transmission) requested can be selected based on the degree of rotation of the UE and whether a new NW beam is selected.

A type 1a BRRS transmission can be requested instead of a type 1b BRRS transmission if the degree of rotation, movement, and/or blockage of the UE 104 is less than a predefined threshold and/or the expected change of the UE beam (e.g., change from the currently selected UE beam 110 to the newly selected UE beam 112) is less than a predetermined threshold. The change (e.g., rotation, movement, and/or blockage) of the UE 104 can be associated to the expected change of the UE beam. That is, a change in the UE 104 can cause a change in the optimal NW-UE beam. A type 2a BRRS transmission can be requested instead of a type 2b BRRS transmission if the degree of rotation, movement, and/or blockage of the UE 104 is less than a predefined threshold and/or the expected change of the UE beam (e.g., change from the currently selected UE beam 110 to the newly selected UE beam 112) is less than a predetermined threshold.

A type 1a BRRS transmission can be requested instead of a type 2a BRRS transmission if the optimal NW-UE beam pair includes a newly selected NW beam. For example, a type 1a or 1b BRRS transmission can be requested if a currently selected NW beam 106 is not expected to change while the type 2a or 2b BRRS transmission can be requested if a currently selected NW beam 106 is expected to change.

FIG. 1 shows a type 1a beam change and FIG. 2 shows a type 1b beam change. FIG. 3 shows a type 2a beam change and FIG. 4 shows a type 2b beam change.

The content of the BRRS request generated by the UE 104 to trigger the BRRS messages can at least include a flag for enabling a BRRS transmission, an indication of BRRS format (e.g., low or high beam change), and/or one or more NW beam indexes. In some examples, a few OFDM symbols (e.g., one to five) can be enabled for type 1a and/or type 2a BRRS transmissions as only a few UE beams around the currently selected UE beams 110 need to be measured. Several OFDM symbols (e.g., six to 10) can be enabled for type 1b and/or type 2b BRRS transmissions to indicate that the UE can perform a full UE beam search. Fewer OFDM symbols (e.g., one to five) can be enabled for type 1a and/or type 2a BRRS transmissions as compared to the OFDM symbols (e.g., six to 10) that are enabled for type 1b and/or type 2b BRRS transmissions due to the type of information that can be incorporated into the request. BRRS transmissions for the type 1a and 2a BRRS transmissions may utilize fewer OFDM symbols than BRRS transmissions for type 1b and/or type 2b BRRS transmissions because the type 1a and 2a BRRS transmissions do not include data that is included in the type 1b and 2b BRRS transmissions. For example, the type 1b and 2b BRRS transmissions can include NW beam indexes while the type 1a and 2a BRRS transmissions may include no NW beam indexes or fewer NW beam indexes than the type 1b and 2b BRRS transmissions.

For type 1a and 1b BRRS transmissions, the BRRS request, generated by the UE 104, may include a 1-bit flag. The 1-bit flag may include a first value indicating a BRRS inactive trigger and a second value indicating a BRRS active trigger. The BRRS inactive trigger may indicate that the BRRS transmission is not requested. The BRRS active trigger may indicate that the BRRS transmission is requested. Alternatively, the BRRS request may transmit a 2-bit flag, where the first value may indicate a BRRS inactive trigger, the second value may indicate a low BRRS active trigger, and the third value may indicate a high BRRS active trigger, while the fourth value may be used to indicate a different type of BRRS trigger.

If the UE is scheduled in a 5G physical uplink shared channel (xPUSCH) transmission, the flag may be transmitted implicitly by a transport block (TB) cyclic redundancy check (CRC) sequence of the xPUSCH. For example, the TB CRC sequence can be determined by a flag indicating a $c_j$ sequence defined as the jth TB CRC sequence. For example, a 0 flag (e.g., [00] bit vector) can indicate an inactive BRRS transmission and a TB CRC $c_0$ sequence. A 1 flag (e.g., [01] bit vector) can indicate a low BRRS transmission and a TB CRC $c_1$ sequence. A 2 flag (e.g., [10] bit vector) can indicate a low BRRS transmission and a TB CRC $c_2$ sequence. A 3 flag (e.g., [11] bit vector) can be reserved. In some examples, the flag can be masked with the TB CRC sequence for the corresponding xPUSCH transmission.

In some examples, a new logical channel ID can be defined and implemented in a medium access control (MAC) layer to convey a BRRS request (e.g., message requesting a BRRS transmission). Further, a corresponding MAC control element may be defined to convey a BRRS request. The MAC control element may include a NW beam index.

If the UE 104 is scheduled in a 5G physical uplink control channel (xPUCCH) transmission, the flag identifying a BRRS request can be transmitted as additional bits associated with an acknowledgement (ACK) and/or a negative acknowledgement (NACK). The flag identifying a BRRS request can also be transmitted as additional bits associated with a channel state information (CSI) report in the xPUCCH transmission.

The flag identifying a BRRS request can also be transmitted via a scheduling request (SR) channel on an xPUCCH transmission. A separate resource can be configured by the UE 104 specific radio resource control (RRC) signaling to differentiate the SR data and BRRS transmission request. The resource for the BRRS request can be distinguished from regular SR data through different resources in time/frequency/code. The reliability and quality of the BRRS request can be different from the SR data in an SR transmission by using fewer codes.

To support type 2a and 2b BRRS transmissions, the UE 104 can transmit a flag identifying a request for a BRRS transmission and the UE 104 can also transmit a NW beam index. That is, the content of the message requesting a BRRS transmission may include a 1-bit BRRS format indicator and an N-bit NW beam index. The N-bit NW beam index can be a one-to-one mapping to a BRS index.

In some examples, the 1-bit BRRS format indicator and the N-bit NW beam index can be combined. A predefined value of the N-bit NW beam index may indicate an inactive BRRS transmission while the rest of the N-bit NW beam indexes can indicate an active BRRS transmission and identify a NW beam via a NW beam index. The predefined value that indicates an inactive BRRS transmission can be used to indicate a type 1a or a type 1b BRRS transmission and identify that the currently selected NW beam 106 index is equal to a newly selected NW beam index. That is, the predefined value can indicate that the currently selected NW beam 106 does not change.

If the UE 104 is scheduled in a 5G physical uplink shared channel (xPUSCH) transmission, then the UE may transmit the BRRS flag and/or the NW beam index information via a MAC control element. If the UE is not scheduled in an xPUSCH transmission, then the UE 104 can transmit a 5G physical random access channel (xPRACH) with a configured preamble index or randomly selected preamble index to transmit the BRRS flag and/or the NW beam index information. The eNodeB 102 can respond to the BRRS flag and/or the NW beam index via a random access response (RAR), which includes the uplink grant for message 3 transmission. That is, the eNodeB 102 can generate the RAR for the UE 104 and/or approve the transmittal of the RAR to the UE 104. The UE 104 can then transmit a cell radio network temporary identifier (C-RNTI) of the UE 104, the BRRS flag, and/or the NW beam index to the eNodeB 102 in a message 3 by xPUSCH. Then, in message 4, the eNodeB 102 can transmit the BRRS.

In some examples, a dedicated SR channel can be used to provide feedback of the NW-UE beam pairs. One-to-one resource association between BRS antenna port and SR resource in time and frequency domain can be defined. The eNodeB 102 can utilize a NW beam for the BRS transmission and the SR reception on the same time and frequency position. If a channel reciprocity exists between downlink channel and uplink channel, the newly selected NW beam information can be carried by the SR resource index in time and frequency domain.

In an example, a UE 104 may further encode the identity of one or more BRS antenna ports in a random access channel (RACH) preamble before transmission of the xPRACH. The eNodeB 102 can detect the optimal receiving NW beam for the RACH and then decode the identity of the BRS antenna port. This example can be utilized if the link using the previous NW-UE beam pair is not reliable and/or if the currently selected NW-UE beam pair is not optimal and a newly selected NW-UE pair can provide a more efficient link between the UE 104 and the eNodeB 102. After successful detection of the SR channel, the eNodeB 102 would use the newly selected NW beams for subsequent data and control transmissions.

FIG. 2 is a system diagram for triggering a BRRS according to one embodiment. FIG. 2 includes an eNodeB 202 and a UE 204 that are analogous to the eNodeB 102 and the UE 104 in FIG. 1.

In FIG. 2 a high beam change is shown. The high beam change is shown by the distance between a currently selected UE beam 210 and a newly selected UE beam 212. The high beam change is shown as two or more beam distance between the UE beam 210 and the UE beam 212. Although FIGS. 1, 2, 3, and 4 show beams in two dimensions, the beams exist in three dimensions.

In FIG. 2 the UE beam 210 and a NW beam 206 can be paired before a BRRS transmission. The UE beam 212 and the NW beam 206 can be paired after the BRRS transmission. That is, the same NW beam 206 can be paired with both the UE beam 210 before the BRRS transmission and the UE beam 212 after the BRRS transmission.

FIG. 3 is a system diagram for triggering a BRRS according to one embodiment. FIG. 3 includes an eNodeB 302 and a UE 304 that are analogous to the eNodeBs 102 and 202 and the UEs 104 and 204 in FIGS. 1 and 2, respectively.

In FIG. 3 a low beam change is shown. The low beam change is shown by the distance between a UE beam 310 and a UE beam 312. The UE beam 310 and the UE beam 312 are next to each other.

In FIG. 3 the UE beam 310 and a NW beam 306 can be paired before a BRRS transmission. The UE beam 312 and a NW beam 308 can be paired after the BRRS transmission. That is, the NW beam 306 is selected before the BRRS transmission and the NW beam 308 is selected after the BRRS transmission.

FIG. 4 is a system diagram for triggering a BRRS according to one embodiment. FIG. 4 includes an eNodeB 402 and a UE 404 that are analogous to the eNodeBs 102, 202, 302 and the UEs 104, 204, and 304 in FIGS. 1, 2, and 3, respectively.

In FIG. 4 a high beam change is shown. A UE beam 410 and an NW beam 406 can be paired before a BRRS transmission. A UE beam 412 and an NW beam 408 can be paired after the BRRS transmission. That is, a different NW beam 408 can be selected before the BRRS transmission than the NW beam 406 that is selected before the BRRS transmission.

Figure 5:
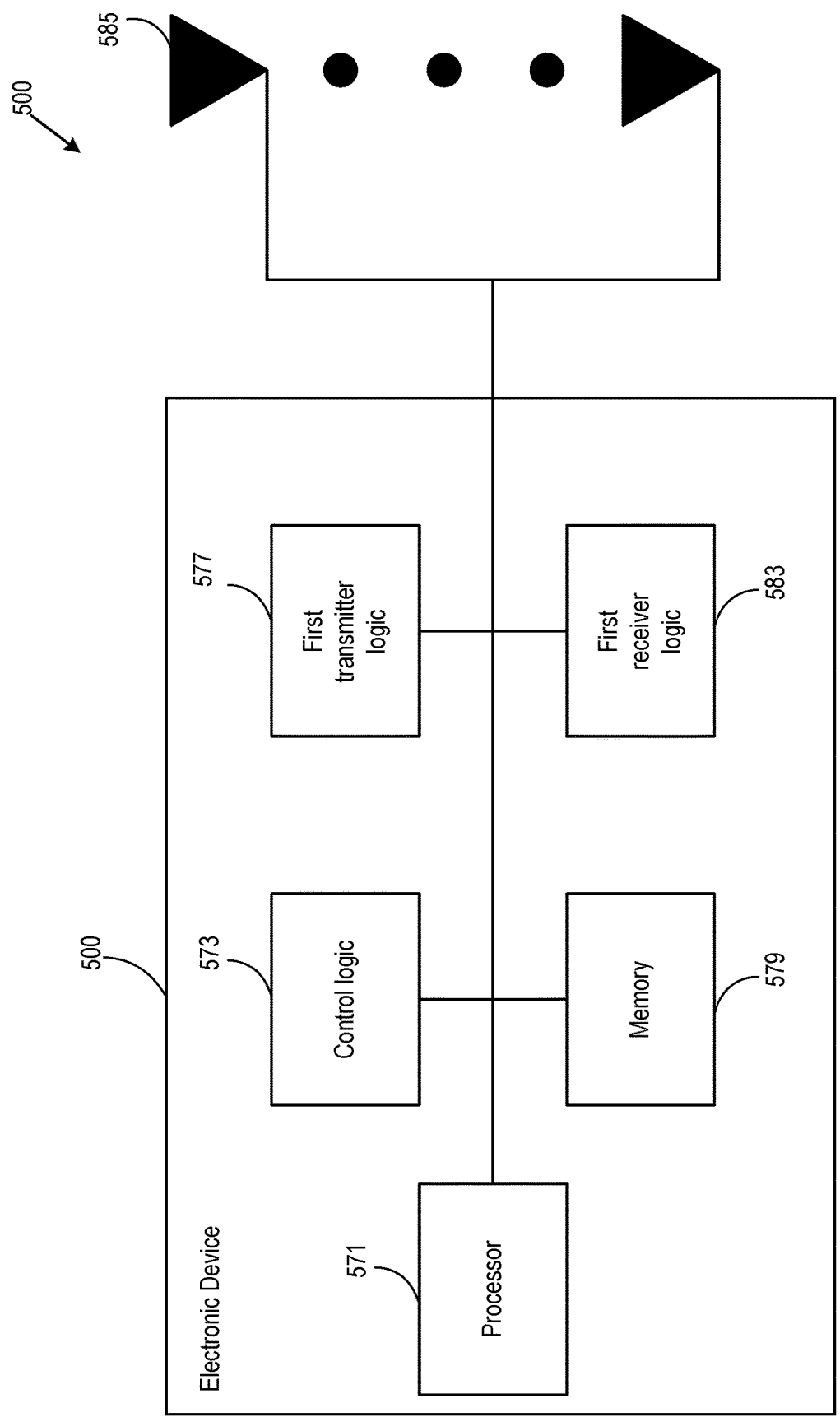
FIG. 5 is a block diagram illustrating electronic device circuitry that may be eNodeB circuitry, user equipment (UE) circuitry, network node circuitry, or some other type of circuitry according to one embodiment.

FIG. 5 is a block diagram illustrating electronic device circuitry that may be eNodeB circuitry, UE circuitry, network node circuitry, or some other type of circuitry according to one embodiment. FIG. 5 illustrates an electronic device 500 that may be, or may be incorporated into or otherwise part of, an eNodeB, a UE, or some other type of electronic device in accordance with various embodiments. Specifically, the electronic device 500 may be logic and/or circuitry that may be at least partially implemented in one or more of hardware, software, and/or firmware. In embodiments, the electronic device logic may include radio transmit/transmitter logic (e.g., a first transmitter logic 577) and receive/receiver logic (e.g., a first receiver logic 583) coupled to a control logic 573 and/or a processor 571. In embodiments, the transmit/transmitter and/or receive/receiver logic may be elements or modules of transceiver logic. The first transmitter logic 577 and the first receiver logic 583 may be housed in separate devices. For example, the first transmitter logic 577 can be incorporated into a first device while the first receiver logic 583 is incorporated into a second device, or the first transmitter logic 577 and the first receiver logic 583 can be incorporated into a device separate from a device including any combination of the control logic 573, a memory 579, and/or the processor 571. The electronic device 500 may be coupled with or include one or more antenna elements 585 of one or more antennas. The electronic device 500 and/or the components of the electronic device 500 may be configured to perform operations similar to those described elsewhere in this disclosure.

In embodiments where the electronic device 500 implements, is incorporated into, or is otherwise part of a UE and/or an eNodeB, or a device portion thereof, the electronic device 500 can generate an extended synchronization signal (ESS). The processor 571 may be coupled to the first receiver and first transmitter. The memory 579 may be coupled to the processor 571 having control logic instructions thereon that, when executed, generate and/or transmit the ESS.

In embodiments where the electronic device 500 receives data, generates data, and/or transmits data to/from a UE to implement a downlink signal including the ESS, the processor 571 may be coupled to a receiver and a transmitter. The memory 579 may be coupled to the processor 571 having control logic 573 instructions thereon that, when executed, may be able to transmit a BRRS transmission.

As used herein, the term "logic" may refer to, be part of, or include an application specific integrated circuit (ASIC), an electronic circuit, the processor 571 (shared, dedicated, or group), and/or the memory 579 (shared, dedicated, or group) that execute one or more software or firmware programs, a combinational logic circuit, and/or other suitable hardware components that provide the described functionality. Specifically, the logic may be at least partially implemented in, or an element of, hardware, software, and/or firmware. In some embodiments, the electronic device logic may be implemented in, or functions associated with the logic may be implemented by, one or more software or firmware modules.

Figure 6:
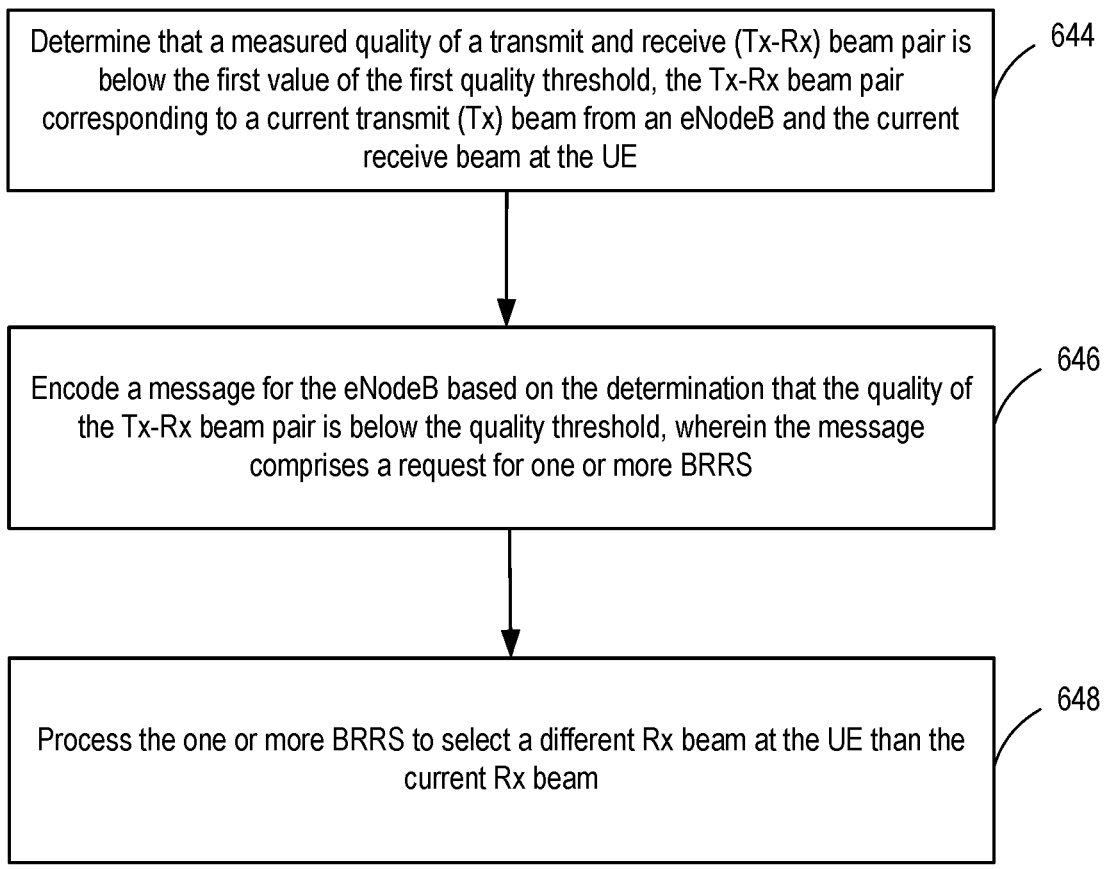
FIG. 6 is a block diagram illustrating a method for triggering a BRRS message according to one embodiment.

FIG. 6 is a block diagram illustrating a method for triggering a BRRS message according to one embodiment. The method can be performed by a baseband processor. The method includes determining 644 that a measured quality of a transmit and receive (Tx-Rx) beam pair is below the first value of the first quality threshold, the Tx-Rx beam pair corresponding to a current transmit (Tx) beam from an eNode and the current receive (Rx) beam at the UE. The method also includes encoding 646 a message for the eNodeB based on the determination that the quality of the Tx-Rx beam pair is below the quality threshold, wherein the message comprises a request for one or more BRRS. The method further includes processing 648 the one or more BRRS to select a different Rx beam at the UE than the current Rx beam.

A second value of a second quality threshold can be less than the first value. If the measured quality is between the first value of the first threshold and the second value of the second threshold, the method can include encoding the message to include an indicator for BRRS format that indicates a short BRRS format. If the measured quality is below the second value of the second threshold, the method can include encoding the message to include the indicator for BRRS format that indicates a long BRRS format.

To determine the measured quality of the Tx-Rx beam pair, the method can include determining at least one of a receive signal strength indicator (RSSI) value, a reference signal receive power (RSRP) value, and a reference signal receive quality (RSRQ) value. The method can also include encoding the message to include a Tx beam index corresponding to the current Tx beam.

The measured quality of the Tx-Rx beam pair can be below the first value of the first quality threshold due to at least one of a rotation of the UE, a movement of the UE, and a blockage of a UE beam. The message can comprise a bit flag to trigger the BRRS. The bit flag can comprise a single bit comprising a BRRS active trigger value and a BRRS inactive trigger value. The bit flag can comprise multiple bits comprising at least an inactive BRRS trigger value, a low beam change of the UE value, and a high beam change of the UE value.

The method can further include encoding the message as a flag that is masked with a cyclic redundancy check (CRC) sequence of a 5G physical uplink shared channel (xPUSCH) transmission. The method can also include encoding the message as a unique logical channel identifier of a medium access control (MAC) layer. The method can also include encoding the message as a MAC control element of a MAC layer.

The method can also include encoding the message as bits associated with an acknowledgement (ACK) or a negative acknowledgement (NACK). The method can further include encoding the message as bits associated with a scheduling request (SR) or uplink control information.

Figure 7:
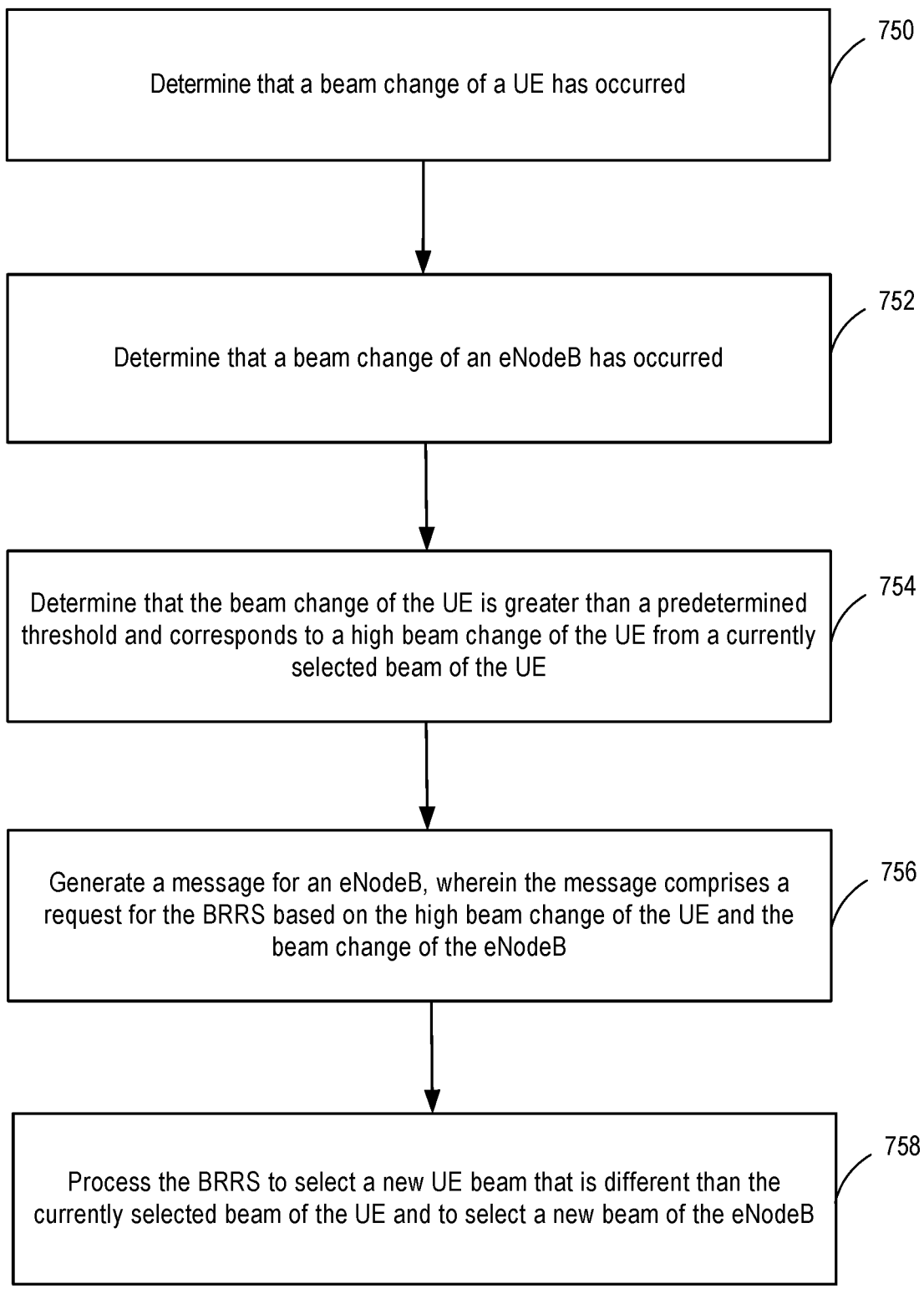
FIG. 7 is a block diagram illustrating a method for triggering a BRRS message according to one embodiment.

FIG. 7 is a block diagram illustrating a method for triggering a BRRS according to one embodiment. The method can be performed by a baseband processor. The method can include determining 750 that a beam change of a UE has occurred, determining 752 that a beam change of an eNodeB has occurred, and determining 754 that the beam change of the UE is greater than a predetermined threshold and corresponds to a high beam change of the UE from a currently selected beam of the UE. The method can also include generating 756 a message for an eNodeB, wherein the message comprises a request for the BRRS based on the high beam change of the UE and the beam change of the eNodeB and processing 758 the BRRS to select a new UE beam that is different than the currently selected beam of the UE and to select a new beam of the eNodeB.

The method can also include generating the message as part of a medium access control (MAC) element. The method can also include generating the message as part of a 5G physical random access channel (xPRACH). The method can further include including the message in a configured preamble index of the xPRACH and/or including the message in a randomly selected preamble index of the xPRACH.

Figure 8:
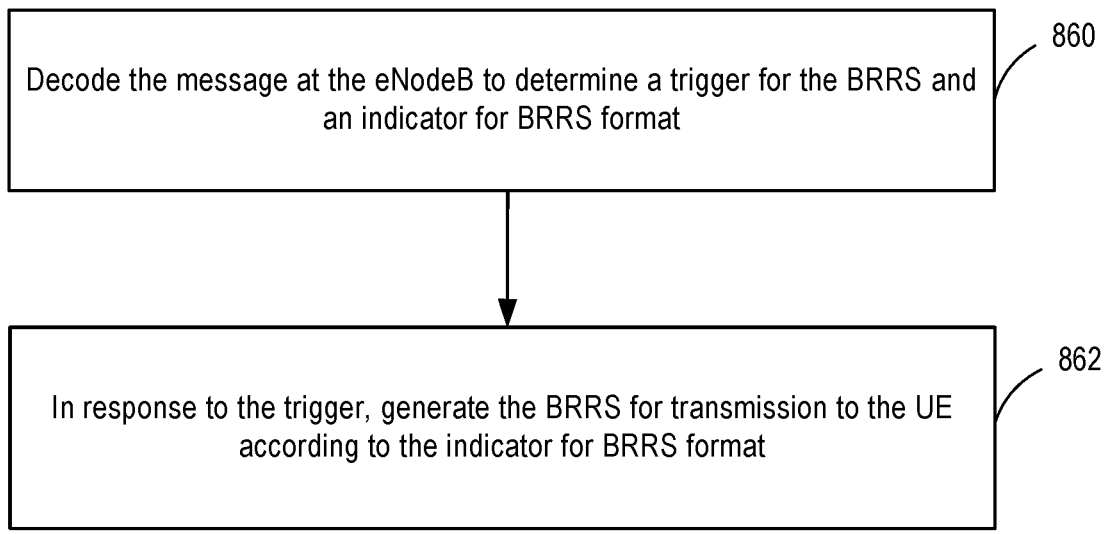
FIG. 8 is a block diagram illustrating a method for triggering a BRRS message according to one embodiment.

FIG. 8 is a block diagram illustrating a method for triggering a BRRS message according to one embodiment. The method can be performed by a baseband processor. The method can include decoding 860 the message at the eNodeB to determine a trigger for the BRRS and an indicator for BRRS format and in response to the trigger, generating 862 the BRRS for transmission to the UE according to the indicator for BRRS format.

The method can also include determining whether the indicator for BRRS format indicates a short BRRS format or a long BRRS format and generating the BRRS to include a number of orthogonal frequency division multiplex (OFDM) symbols based on the determination of the short BRRS format or the long BRRS format.

The method can further include, for the short BRRS format, generating the BRRS to include between one and five OFDM symbols and, for the long BRRS format, generating the BRRS to include between six and 10 OFDM symbols. The method can also include decoding the message at the eNodeB to determine a transmit (Tx) beam index and generating the BRRS for a plurality of Tx beams spatially at or near a first Tx beam corresponding to the Tx beam index. The first Tx beam can comprise a current Tx beam used by the eNodeB for the UE. The first Tx beam can comprise a next Tx beam suggested by the UE for use by the eNodeB.

Figure 9:
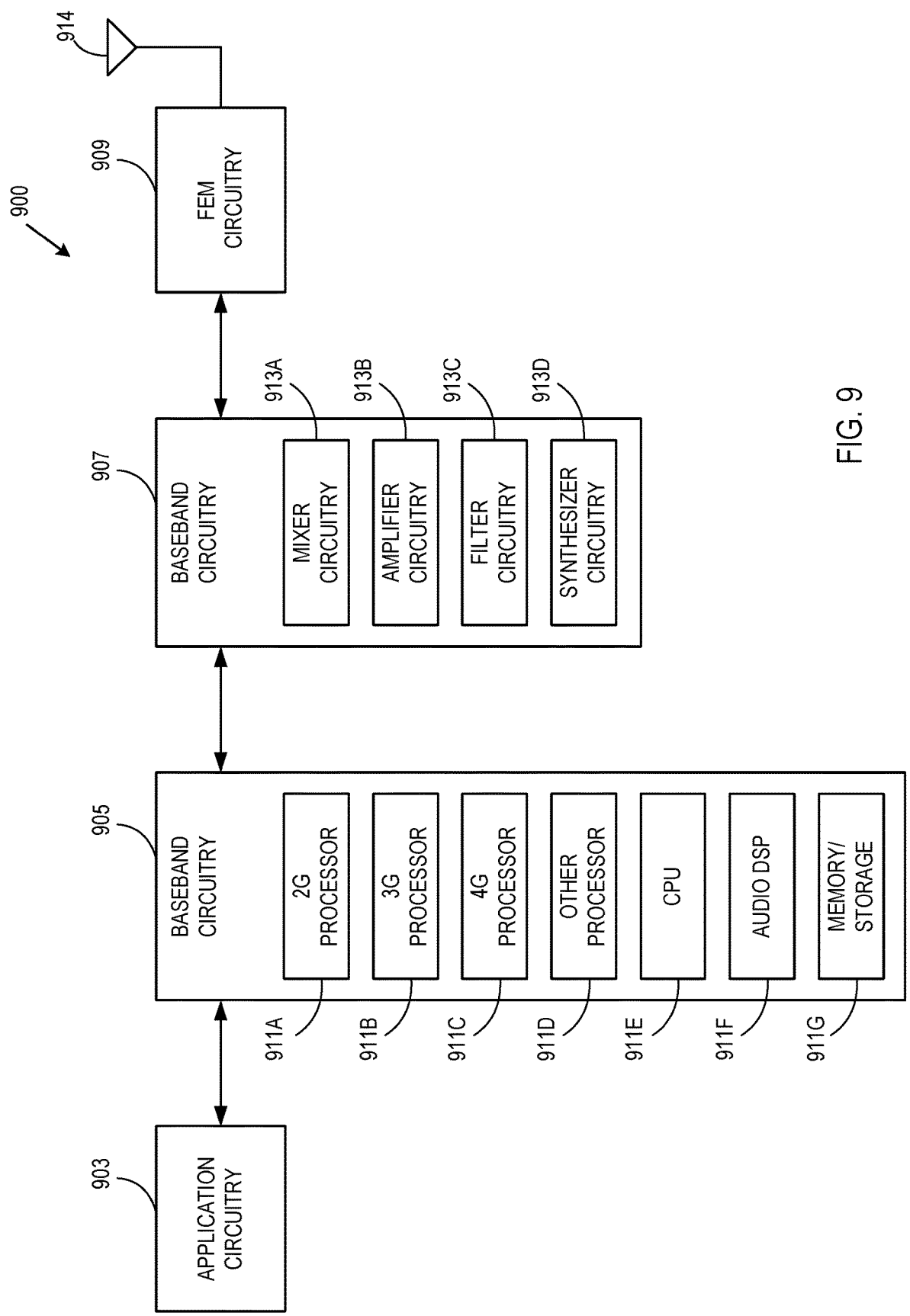
FIG. 9 is a block diagram illustrating components of a device according to one embodiment.

FIG. 9 is a block diagram illustrating components of a device according to one embodiment. In some embodiments, the device may include application circuitry 903, baseband circuitry 905, Radio Frequency (RF) circuitry 907, front-end module (FEM) circuitry 909, and one or more antennas 914, coupled together at least as shown in FIG. 9. Any combination or subset of these components can be included, for example, in a UE device or an eNodeB device.

The application circuitry 903 may include one or more application processors. By way of non-limiting example, the application circuitry 903 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 905 may include one or more single-core or multi-core processors. The baseband circuitry 905 may include one or more baseband processors and/or control logic. The baseband circuitry 905 may be configured to process baseband signals received from a receive signal path of the RF circuitry 907. The baseband circuitry 905 may also be configured to generate baseband signals for a transmit signal path of the RF circuitry 907. The baseband circuitry 905 may interface with the application circuitry 903 for generation and processing of the baseband signals, and for controlling operations of the RF circuitry 907.

By way of non-limiting example, the baseband circuitry 905 may include at least one of a second generation (2G) baseband processor 911A, a third generation (3G) baseband processor 911B, a fourth generation (4G) baseband processor 911C, and other baseband processor(s) 911D for other existing generations and generations in development or to be developed in the future (e.g., fifth generation (5G), sixth generation (6G), etc.). The baseband circuitry 905 (e.g., at least one of the baseband processors 911A-911D) may handle various radio control functions that enable communication with one or more radio networks via the RF circuitry 907. By way of non-limiting example, the radio control functions may include signal modulation/demodulation, encoding/decoding, radio frequency shifting, other functions, and combinations thereof. In some embodiments, modulation/demodulation circuitry of the baseband circuitry 905 may be programmed to perform Fast-Fourier Transform (FFT), precoding, constellation mapping/demapping functions, other functions, and combinations thereof. In some embodiments, encoding/decoding circuitry of the baseband circuitry 905 may be programmed to perform convolutions, tail-biting convolutions, turbo, Viterbi, low density parity check (LDPC) encoder/decoder functions, other functions, and combinations thereof. Embodiments of modulation/demodulation and encoder/decoder functions are not limited to these examples, and may include other suitable functions.

In some embodiments, the baseband circuitry 905 may include elements of a protocol stack. By way of non-limiting example, elements of an evolved universal terrestrial radio access network (E-UTRAN) protocol include, for example, physical (PHY), medium access control (MAC), radio link control (RLC), packet data convergence protocol (PDCP), and/or radio resource control (RRC) elements. A central processing unit (CPU) 911E of the baseband circuitry 905 may be programmed to run elements of the protocol stack for signaling of the PHY, MAC, RLC, PDCP and/or RRC layers. In some embodiments, the baseband circuitry 905 may include one or more audio digital signal processor(s) (DSP) 911F. The audio DSP(s) 911F may include elements for compression/decompression and echo cancellation. The audio DSP(s) 911F may also include other suitable processing elements.

The baseband circuitry 905 may further include a memory/storage 911G. The memory/storage 911G may include data and/or instructions for operations performed by the processors of the baseband circuitry 905 stored thereon. In some embodiments, the memory/storage 911G may include any combination of suitable volatile memory and/or non-volatile memory. The memory/storage 911G may also include any combination of various levels of memory/storage including, but not limited to, read-only memory (ROM) having embedded software instructions (e.g., firmware), random access memory (e.g., dynamic random access memory (DRAM)), caches, buffers, etc. In some embodiments, the memory/storage 911G may be shared among the various processors or dedicated to particular processors.

Components of the baseband circuitry 905 may be suitably combined in a single chip or a single chipset, or disposed on a same circuit board in some embodiments. In some embodiments, some or all of the constituent components of the baseband circuitry 905 and the application circuitry 903 may be implemented together, such as, for example, on a system on a chip (SOC).

In some embodiments, the baseband circuitry 905 may provide for communication compatible with one or more radio technologies. For example, in some embodiments, the baseband circuitry 905 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 905 is configured to support radio communications of more than one wireless protocol may be referred to as multi-mode baseband circuitry.

The RF circuitry 907 may enable communication with wireless networks using modulated electromagnetic radiation through a non-solid medium. In various embodiments, the RF circuitry 907 may include switches, filters, amplifiers, etc., to facilitate the communication with the wireless network. The RF circuitry 907 may include a receive signal path, which may include circuitry to down-convert RF signals received from the FEM circuitry 909, and provide baseband signals to the baseband circuitry 905. The RF circuitry 907 may also include a transmit signal path, which may include circuitry to up-convert baseband signals provided by the baseband circuitry 905, and provide RF output signals to the FEM circuitry 909 for transmission.

In some embodiments, the RF circuitry 907 may include a receive signal path and a transmit signal path. The receive signal path of the RF circuitry 907 may include a mixer circuitry 913A, an amplifier circuitry 913B, and a filter circuitry 913C. The transmit signal path of the RF circuitry 907 may include the filter circuitry 913C and the mixer circuitry 913A. The RF circuitry 907 may further include a synthesizer circuitry 913D configured to synthesize a frequency for use by the mixer circuitry 913A of the receive signal path and the transmit signal path. In some embodiments, the mixer circuitry 913A of the receive signal path may be configured to down-convert RF signals received from the FEM circuitry 909 based on the synthesized frequency provided by the synthesizer circuitry 913D. The amplifier circuitry 913B may be configured to amplify the down-converted signals.

The filter circuitry 913C may include a low-pass filter (LPF) or band-pass filter (BPF) configured to remove unwanted signals from the down-converted signals to generate output baseband signals. Output baseband signals may be provided to the baseband circuitry 905 for further processing. In some embodiments, the output baseband signals may include zero-frequency baseband signals, although this is not a requirement. In some embodiments, the mixer circuitry 913A of the receive signal path may comprise passive mixers, although the scope of the embodiments is not limited in this respect.

In some embodiments, the mixer circuitry 913A of the transmit signal path may be configured to up-convert input baseband signals based on the synthesized frequency provided by the synthesizer circuitry 913D to generate RF output signals for the FEM circuitry 909. The baseband signals may be provided by the baseband circuitry 905 and may be filtered by the filter circuitry 913C. The filter circuitry 913C may include an LPF, although the scope of the embodiments is not limited in this respect.

In some embodiments, the mixer circuitry 913A of the receive signal path and the mixer circuitry 913A of the transmit signal path may include two or more mixers, and may be arranged for quadrature downconversion and/or upconversion, respectively. In some embodiments, the mixer circuitry 913A of the receive signal path and the mixer circuitry 913A of the transmit signal path may include two or more mixers and may be arranged for image rejection (e.g., Hartley image rejection). In some embodiments, the mixer circuitry 913A of the receive signal path and the mixer circuitry 913A of the transmit signal path may be arranged for direct downconversion and/or direct upconversion, respectively. In some embodiments, the mixer circuitry 913A of the receive signal path and the mixer circuitry 913A of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 907 may include analog-to-digital converter (ADC) and digital-to-analog converter (DAC) circuitry, and the baseband circuitry 905 may include a digital baseband interface to communicate with the RF circuitry 907.

In some dual-mode embodiments, separate radio interference cancellation (IC) circuitry may be provided for processing signals for each spectrum, although the scope of the embodiments is not limited in this respect.

In some embodiments, the synthesizer circuitry 913D may include one or more of a fractional-N synthesizer and a fractional N/N+1 synthesizer, although the scope of the embodiments is not limited in this respect, as other types of frequency synthesizers may be suitable. For example, the synthesizer circuitry 913D may include a delta-sigma synthesizer, a frequency multiplier, a synthesizer comprising a phase-locked loop with a frequency divider, other synthesizers, and combinations thereof.

The synthesizer circuitry 913D may be configured to synthesize an output frequency for use by the mixer circuitry 913A of the RF circuitry 907 based on a frequency input and a divider control input. In some embodiments, the synthesizer circuitry 913D may be a fractional N/N+1 synthesizer.

In some embodiments, frequency input may be provided by a voltage controlled oscillator (VCO), although that is not a requirement. Divider control input may be provided by either the baseband circuitry 905 or the application circuitry 903 depending on the desired output frequency. In some embodiments, a divider control input (e.g., N) may be determined from a look-up table based on a channel indicated by the application circuitry 903.

The synthesizer circuitry 913D of the RF circuitry 907 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 913D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be an LO frequency (fLO). In some embodiments, the RF circuitry 907 may include an IQ/polar converter.

The FEM circuitry 909 may include a receive signal path, which may include circuitry configured to operate on RF signals received from the one or more antennas 914, amplify the received signals, and provide the amplified versions of the received signals to the RF circuitry 907 for further processing. The FEM circuitry 909 may also include a transmit signal path, which may include circuitry configured to amplify signals for transmission provided by the RF circuitry 907 for transmission by at least one of the one or more antennas 914.

In some embodiments, the FEM circuitry 909 may include a TX/RX switch configured to switch between a transmit mode and a receive mode operation. The FEM circuitry 909 may include a receive signal path and a transmit signal path. The receive signal path of the FEM circuitry 909 may include a low-noise amplifier (LNA) to amplify received RF signals and provide the amplified received RF signals as an output (e.g., to the RF circuitry 907). The transmit signal path of the FEM circuitry 909 may include a power amplifier (PA) configured to amplify input RF signals (e.g., provided by the RF circuitry 907), and one or more filters configured to generate RF signals for subsequent transmission (e.g., by the one or more antennas 914).

In some embodiments, the device may include additional elements such as, for example, memory/storage, a display, a camera, one of more sensors, an input/output (I/O) interface, other elements, and combinations thereof.

In some embodiments, the device may be configured to perform one or more processes, techniques, and/or methods as described herein, or portions thereof.

Figure 10:
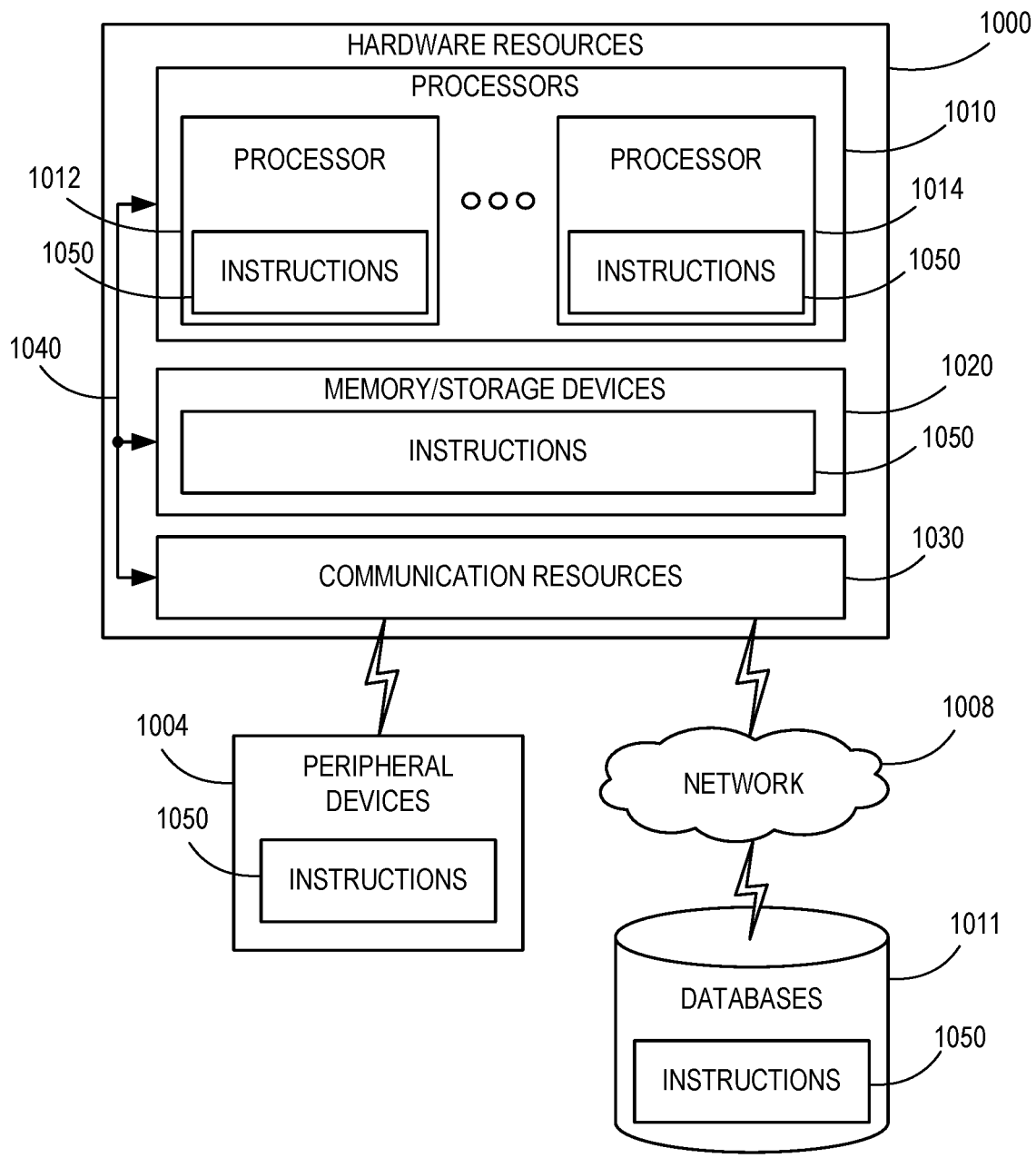
FIG. 10 is a block diagram illustrating components according to some embodiments.

FIG. 10 is a block diagram illustrating components according to some embodiments. Specifically, FIG. 10 shows a diagrammatic representation of hardware resources 1000 including one or more processors (or processor cores) 1010, one or more memory/storage devices 1020, and one or more communication resources 1030, which communicatively coupled via a bus 1040.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014. The memory/storage devices 1020 may include main memory, disk storage, or any suitable combination thereof.

The communication resources 1030 may include interconnection and/or network interface components or other suitable devices to communicate with one or more peripheral devices 1004 and/or one or more databases 1011 via a network 1008. For example, the communication resources 1030 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1050 may comprise software, a program, an application, an applet, an app, or other executable code for causing at least one of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 and/or the databases 1011. Accordingly, the memory of the processors 1010, the memory/storage devices 1020, the peripheral devices 1004, and the databases 1011 are examples of computer-readable and machine-readable media.

Example Embodiments

Example 1 is an apparatus for a user equipment (UE) to trigger a beam refinement reference signal (BRRS). The apparatus includes memory to store a first value of a first quality threshold and an identifier of a current receive (Rx) beam at the UE. The apparatus includes one or more baseband processors designed to determine that a measured quality of a transmit and receive (Tx-Rx) beam pair is below the first value of the first quality threshold, the Tx-Rx beam pair corresponding to a current transmit (Tx) beam from an evolved node B (eNodeB) and the current Rx beam at the UE. The apparatus includes one or more baseband processors designed to encode a message for the eNodeB based on the determination that the quality of the Tx-Rx beam pair is below the quality threshold, where the message includes a request for one or more BRRSs, and process the one or more BRRSs to select a different Rx beam at the UE than the current Rx beam.

Example 2 is the apparatus of Example 1, where the memory is further to store a second value of a second quality threshold, where the second value is less than the first value, and where the one or more baseband processors are further designed to if the measured quality is between the first value of the first threshold and the second value of the second threshold, encode the message to include an indicator BRRS format that indicates a short BRRS format; and if the measured quality is below the second value of the second threshold, encode the message to include the indicator for BRRS format that indicates a long BRRS format.

Example 3 is the apparatus of Example 1, where to determine the measured quality of the Tx-Rx beam pair, the one or more baseband processors are further configured to determine at least one of a receive signal strength indicator (RSSI) value, a reference signal receive power (RSRP) value, and a reference signal receive quality (RSRQ) value.

Example 4 is the apparatus of Example 1, where the one or more baseband processors are further configured to encode the message to include a Tx beam index corresponding to the current Tx beam.

Example 5 is the apparatus of Example 1, where the measured quality of the Tx-Rx beam pair is below the first value of the first quality threshold due to at least one of a rotation of the UE, a movement of the UE, and a blockage of a UE beam.

Example 6 is the apparatus of Example 1, where the message includes a bit flag to trigger the one or more BRRSs.

Example 7 is the apparatus of Example 6, where the bit flag includes a single bit comprising a BRRS active trigger value and a BRRS inactive trigger value.

Example 8 is the apparatus of Example 6, where the bit flag includes multiple bits comprising at least an inactive BRRS trigger value, a low beam change of the UE value, and a high beam change of the UE value.

Example 9 is the apparatus of Example 1, where to encode the message, the one or more baseband processors are further configured to encode the message as a flag that is masked with a cyclic redundancy check (CRC) sequence of a 5G physical uplink shared channel (xPUSCH) transmission.

Example 10 is the apparatus of Example 1, where to encode the message, the one or more baseband processors are further configured to encode the message as a unique logical channel identifier of a medium access control (MAC) layer.

Example 11 is the apparatus of Example 1, where to encode the message, the one or more baseband processors are further configured to encode the message as a MAC control element of a MAC layer.

Example 12 is the apparatus of Example 1, where to encode the message, the one or more baseband processors are further configured to encode the message as bits associated with an acknowledgement (ACK) or a negative acknowledgement (NACK).

Example 13 is the apparatus of Example 1, where to encode the message, the one or more baseband processors are further configured to encode the message as bits associated with a scheduling request (SR) or uplink control information.

Example 14 is an apparatus for a evolved node B (eNodeB) to provide a beam refinement reference signal (BRRS). The apparatus includes memory to store a message from a user equipment (UE). The apparatus includes one or more baseband processors configured to decode the message at the eNodeB to determine a trigger for the BRRS and an indicator for BRRS format, and in response to the trigger, generate the BRRS for transmission to the UE according to the indicator for BRRS format.

Example 15 is the apparatus of Example 14, where the one or more baseband processors are further designed to determine whether the indicator for BRRS format indicates a short BRRS format or a long BRRS format, and generate the BRRS to include a number of orthogonal frequency division multiplex (OFDM) symbols based on the determination of the short BRRS format or the long BRRS format.

Example 16 is the apparatus of Example 15, where the one or more baseband processors are further designed to for the short BRRS format, generate the BRRS to include between one and five OFDM symbols, and for the long BRRS format, generate the BRRS to include between six and 10 OFDM symbols.

Example 17 is the apparatus of Example 14, where the one or more baseband processors are further designed to decode the message at the eNodeB to determine a transmit (Tx) beam index, and generate the BRRS for a variety of Tx beams spatially at or near a first Tx beam corresponding to the Tx beam index.

Example 18 is the apparatus of Example 17, where the first Tx beam includes a current Tx beam used by the eNodeB for the UE.

Example 19 is the apparatus of Example 17, where the first Tx beam includes a next Tx beam suggested by the UE for use by the eNodeB.

Example 20 is a computer-readable storage medium having stored thereon instructions that, when implemented by a computing device, cause the computing device to determine that a beam change of a user equipment (UE) has occurred, and determine that a beam change of an evolved node B (eNodeB) has occurred. The computer-readable storage medium having stored thereon instructions that, when implemented by a computing device, also causes the computing device to determine that the beam change of the UE is greater than a predetermined threshold and corresponds to a high beam change of the UE from a currently selected beam of the UE. computer-readable storage medium having stored thereon instructions that, when implemented by a computing device, cause the computing device to generate a message for an eNodeB, where the message includes a request for the beam refinement reference signal (BRRS) based on the high beam change of the UE and the beam change of the eNodeB, and process the BRRS to select a new UE beam that is different than the currently selected beam of the UE and to select a new beam of the eNodeB.

Example 21 is the computer-readable storage medium of Example 20, where the instructions to generate the message further include instructions to generate the message as part of a medium access control (MAC) element.

Example 22 is the computer-readable storage medium of Example 20, where the instructions to generate the message further include instructions to generate the message as part of a 5G physical random access channel (xPRACH).

Example 23 is the computer-readable storage medium of Example 22, where the instructions further cause the computing device to include the message in a configured preamble index of the xPRACH.

Example 24 is the computer-readable storage medium of Example 23, where the instructions further cause the computing device to include the message in a randomly selected preamble index of the xPRACH.

Example 25 is a method for triggering a beam refinement reference signal (BRRS), including determining that a measured quality of a transmit and receive (Tx-Rx) beam pair is below a first value of a first quality threshold, the Tx-Rx beam pair corresponding to a current transmit (Tx) beam from an evolved node B (eNodeB) and a current Rx beam at a user equipment (UE). The method for triggering a beam refinement reference signal (BRRS), also includes encoding a message for the eNodeB based on the determination that the quality of the Tx-Rx beam pair is below the quality threshold, where the message includes a request for one or more BRRSs, and processing the one or more BRRSs to select a different Rx beam at the UE than the current Rx beam.

Example 26 is the method of Example 25, further including a second value of a second quality threshold, where the second value is less than the first value, and further including if the measured quality is between the first value of the first threshold and the second value of the second threshold, encoding the message to include an indicator BRRS format that indicates a short BRRS format, and if the measured quality is below the second value of the second threshold, encoding the message to include the indicator for BRRS format that indicates a long BRRS format.

Example 27 is the method of Example 25, where determining the measured quality of the Tx-Rx beam pair further includes determining at least one of a receive signal strength indicator (RSSI) value, a reference signal receive power (RSRP) value, and a reference signal receive quality (RSRQ) value.

Example 28 is the method of Example 25, further comprising encoding the message to include a Tx beam index corresponding to the current Tx beam.

Example 29 is the method of Example 25, where the measured quality of the Tx-Rx beam pair is below the first value of the first quality threshold due to at least one of a rotation of the UE, a movement of the UE, and a blockage of a UE beam.

Example 30 is the method of Example 25, where the message includes a bit flag to trigger the one or more BRRSs.

Example 31 is the method of Example 30, where the bit flag includes a single bit including a BRRS active trigger value and a BRRS inactive trigger value.

Example 32 is the method of Example 30, where the bit flag includes multiple bits including at least an inactive BRRS trigger value, a low beam change of the UE value, and a high beam change of the UE value.

Example 33 is the method of Example 25, where encoding the message further includes encoding the message as a flag that is masked with a cyclic redundancy check (CRC) sequence of a 5G physical uplink shared channel (xPUSCH) transmission.

Example 34 is the method of Example 25, where encoding the message further includes encoding the message as a unique logical channel identifier of a medium access control (MAC) layer.

Example 35 is the method of Example 25, where encoding the message further includes encoding the message as a MAC control element of a MAC layer.

Example 36 is the method of Example 25, where encoding the message further includes encoding the message as bits associated with an acknowledgement (ACK) or a negative acknowledgement (NACK).

Example 37 is the method of Example 25, where encoding the message further includes encoding the message as bits associated with a scheduling request (SR) or uplink control information.

Example 38 is a method for providing a beam refinement reference signal (BRRS), including storing a message from a user equipment (UE), and decoding the message at an evolved node B (eNodeB) to determine a trigger for the BRRS and an indicator for BRRS format. The method method for providing a beam refinement reference signal (BRRS) also includes in response to the trigger, generating the BRRS for transmission to the UE according to the indicator for BRRS format.

Example 39 is the method of Example 38, further including determining whether the indicator for BRRS format indicates a short BRRS format or a long BRRS format, and generating the BRRS to include a number of orthogonal frequency division multiplex (OFDM) symbols based on the determination of the short BRRS format or the long BRRS format.

Example 40 is the method of Example 39, further including for the short BRRS format, generating the BRRS to include between one and five OFDM symbols, and for the long BRRS format, generating the BRRS to include between six and 10 OFDM symbols.

Example 41 is the method of Example 38, further including decoding the message at the eNodeB to determine a transmit (Tx) beam index, and generating the BRRS for a variery of Tx beams spatially at or near a first Tx beam corresponding to the Tx beam index.

Example 42 is the method of Example 41, where the first Tx beam includes a current Tx beam used by the eNodeB for the UE.

Example 43 is the method of Example 41, where the first Tx beam includes a next Tx beam suggested by the UE for use by the eNodeB.

Example 44 is a method. The method includes determining that a beam change of a user equipment (UE) has occurred, and determining that a beam change of an evolved node B (eNodeB) has occurred. The method includes determining that the beam change of the UE is greater than a predetermined threshold and corresponds to a high beam change of the UE from a currently selected beam of the UE. The method includes generating a message for an eNodeB, where the message includes a request for the beam refinement reference signal (BRRS) based on the high beam change of the UE and the beam change of the eNodeB, and processing the BRRS to select a new UE beam that is different than the currently selected beam of the UE and to select a new beam of the eNodeB.

Example 45 is the method of Example 44, where generating the message further includes generating the message as part of a medium access control (MAC) element.

Example 46 is the method of Example 44, where generating the message further includes generating the message as part of a 5G physical random access channel (xPRACH).

Example 47 is the method of Example 44, further including the message in a configured preamble index of the xPRACH.

Example 48 is the method of Example 47, further including the message in a randomly selected preamble index of the xPRACH.

Example 49 is at least one computer-readable storage medium having stored thereon computer-readable instructions, when executed, to implement a method as exemplified in any of Examples 25-48.

Example 50 is an apparatus including manners to perform a method as exemplified in any of Examples 25-48.

Example 51 is a manner for performing a method as exemplified in any of Examples 25-48.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic devices, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. An apparatus for a user equipment (UE) to trigger a beam refinement reference signal (BRRS), comprising:
   memory to store a first value of a first quality threshold and an identifier of a current receive (Rx) beam at the UE; and
   one or more baseband processors configured to:
      determine that a measured quality of a transmit and receive (Tx-Rx) beam pair is below the first value of the first quality threshold, the Tx-Rx beam pair corresponding to a current transmit (Tx) beam from an evolved node B (eNodeB) and the current Rx beam at the UE;
      select a BRRS format to request from the eNodeB based on degree of expected beam change at the UE from the current Rx beam and whether a new Tx beam is to be utilized by the eNodeB;
      encode a message for the eNodeB based on the determination that the quality of the Tx-Rx beam pair is below the quality threshold, wherein the message comprises a request for one or more BRRSs and an indicator of the selected BRRS format; and
      process one or more BRRSs to select a different Rx beam at the UE than the current Rx beam, the one or more BRRSs received from the eNodeB in the selected BRRS format based on the message.

2. The apparatus of claim 1, wherein the memory is further to store a second value of a second quality threshold, wherein the second value is less than the first value, and wherein the one or more baseband processors are further configured to:
   if the measured quality is between the first value of the first threshold and the second value of the second threshold, encode the message to include an indicator BRRS format that indicates a short BRRS format; and
   if the measured quality is below the second value of the second threshold, encode the message to include the indicator for BRRS format that indicates a long BRRS format.

3. The apparatus of claim 1, wherein to determine the measured quality of the Tx-Rx beam pair, the one or more baseband processors are further configured to determine at least one of a receive signal strength indicator (RSSI) value, a reference signal receive power (RSRP) value, and a reference signal receive quality (RSRQ) value.

4. The apparatus of claim 1, wherein the one or more baseband processors are further configured to encode the message to include a Tx beam index corresponding to the current Tx beam.

5. The apparatus of claim 1, wherein the baseband processors are to determine that a measured quality of the Tx-Rx beam pair is below the first value of the first quality threshold in response to a determination that the measured quality of the Tx-Rx beam pair is below the first value of the first quality threshold due to at least one of a rotation of the UE, a movement of the UE, and a blockage of a UE beam.

6. The apparatus of claim 5, wherein the one or more baseband processors are to select the BRRS format based on at least one of a degree of rotation of the UE, a degree of movement of the UE, and a degree of blockage of the UE beam.

7. The apparatus of claim 1, wherein the message comprises a bit flag to trigger the one or more BRRSs.

8. The apparatus of claim 7, wherein the bit flag comprises a single bit comprising a BRRS active trigger value and a BRRS inactive trigger value.

9. The apparatus of claim 7, wherein the bit flag comprises multiple bits comprising at least an inactive BRRS trigger value, a low beam change of the UE value, and a high beam change of the UE value.

10. The apparatus of claim 1, wherein to encode the message, the one or more baseband processors are further configured to encode the message as a flag that is masked with a cyclic redundancy check (CRC) sequence of a 5G physical uplink shared channel (xPUSCH) transmission.

11. The apparatus of claim 1, wherein to encode the message, the one or more baseband processors are further configured to encode the message as a unique logical channel identifier of a medium access control (MAC) layer.

12. The apparatus of claim 1, wherein to encode the message, the one or more baseband processors are further configured to encode the message as a MAC control element of a MAC layer.

13. The apparatus of claim 1, wherein to encode the message, the one or more baseband processors are further configured to encode the message as bits associated with an acknowledgement (ACK) or a negative acknowledgement (NACK).

14. The apparatus of claim 1, wherein to encode the message, the one or more baseband processors are further configured to encode the message as bits associated with a scheduling request (SR) or uplink control information.

15. An apparatus for an evolved node B (eNodeB) to provide a beam refinement reference signal (BRRS), comprising:
memory to store a message from a user equipment (UE); and
one or more baseband processors configured to:
decode the message at the eNodeB to determine a trigger for the BRRS and an indicator for BRRS format, the BRRS format based on a degree of expected beam change at the UE and whether a new Tx beam is to be utilized by the eNodeB; and
in response to the trigger, generate the BRRS for transmission to the UE according to the indicator for BRRS format.

16. The apparatus of claim 15, wherein the one or more baseband processors are further configured to:
determine whether the indicator for BRRS format indicates a short BRRS format or a long BRRS format; and
generate the BRRS to include a number of orthogonal frequency division multiplex (OFDM) symbols based on the determination of the short BRRS format or the long BRRS format.

17. The apparatus of claim 16, wherein the one or more baseband processors are further configured to:
for the short BRRS format, generate the BRRS to include between one and five OFDM symbols; and
for the long BRRS format, generate the BRRS to include between six and 10 OFDM symbols.

18. The apparatus of claim 15 wherein the one or more baseband processors are further configured to:
decode the message at the eNodeB to determine a transmit (Tx) beam index; and
generate the BRRS for a plurality of Tx beams spatially at or near a first Tx beam corresponding to the Tx beam index.

19. The apparatus of claim 18, wherein the first Tx beam comprises a current Tx beam used by the eNodeB for the UE.

20. The apparatus of claim 18, wherein the first Tx beam comprises a next Tx beam suggested by the UE for use by the eNodeB.

21. A non-transitory computer-readable storage medium having stored thereon instructions that, when implemented by a computing device, cause the computing device to:
determine that a beam change of a user equipment (UE) has occurred;
determine that a beam change of an evolved node B (eNodeB) has occurred;
determine that the beam change of the UE is greater than a predetermined threshold and corresponds to a high beam change of the UE from a currently selected beam of the UE;
select a BRRS format to request from the eNodeB based on degree of expected beam change at the UE from the current Rx beam and whether a new Tx beam is to be utilized by the eNodeB;
generate a message for an eNodeB, wherein the message comprises a request for the beam refinement reference signal (BRRS) based on the high beam change of the UE and the beam change of the eNodeB and an indicator for the selected BRRS format; and
process a BRRS to select a new UE beam that is different than the currently selected beam of the UE and to select a new beam of the eNodeB, the one or more BRRSs received from the eNodeB in the selected BRRS format based on the message.

22. The computer-readable storage medium of claim 21, wherein the instructions to generate the message further comprise instructions to generate the message as part of a medium access control (MAC) element.

23. The computer-readable storage medium of claim 21, wherein the instructions to generate the message further comprise instructions to generate the message as part of a 5G physical random access channel (xPRACH).

24. The computer-readable storage medium of claim 23, wherein the instructions further cause the computing device to include the message in a configured preamble index of the xPRACH.

25. The computer-readable storage medium of claim 24, wherein the instructions further cause the computing device to include the message in a randomly selected preamble index of the xPRACH.

* * * * *